United States Patent
Saito

(10) Patent No.: US 9,571,237 B2
(45) Date of Patent: Feb. 14, 2017

(54) WIRELESS TRANSFER DEVICE AND METHOD FOR CONTROL OF WIRELESS TRANSFER BAND

(71) Applicant: NEC Corporation, Tokyo (JP)

(72) Inventor: Kaichiro Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 55 days.

(21) Appl. No.: 14/413,914

(22) PCT Filed: Jul. 4, 2013

(86) PCT No.: PCT/JP2013/004159
§ 371 (c)(1),
(2) Date: Jan. 9, 2015

(87) PCT Pub. No.: WO2014/010209
PCT Pub. Date: Jan. 16, 2014

(65) Prior Publication Data
US 2015/0172008 A1  Jun. 18, 2015

(30) Foreign Application Priority Data

Jul. 12, 2012  (JP) ................. 2012-156324

(51) Int. Cl.
*H04L 1/20* (2006.01)
*H04L 1/00* (2006.01)
(Continued)

(52) U.S. Cl.
CPC ............ *H04L 1/206* (2013.01); *H04L 1/0003* (2013.01); *H04L 1/0009* (2013.01); *H04L 5/006* (2013.01);
(Continued)

(58) Field of Classification Search
CPC ...... H04L 1/0003; H04L 5/0044; H04L 5/006; H04L 1/0009; H04L 1/206; H04L 5/0064; H04L 1/00; H04W 28/0236; H04W 24/08; H04W 28/02
See application file for complete search history.

(56) References Cited

U.S. PATENT DOCUMENTS

2003/0202478 A1  10/2003  Saxena et al.
2005/0245258 A1*  11/2005  Classon ............... H04L 5/0037
                                                                    455/434

(Continued)

FOREIGN PATENT DOCUMENTS

JP     2006-86626      3/2006
JP     2011-239322     11/2011
(Continued)

OTHER PUBLICATIONS

Extended European Search Report mailed Feb. 10, 2016 by the European Patent Office in counterpart European Patent Application No. 13817624.3.
(Continued)

*Primary Examiner* — Anez Ebrahim
(74) *Attorney, Agent, or Firm* — Finnegan, Henderson, Farabow, Garrett & Dunner, L.L.P.

(57) ABSTRACT

A wireless transfer device (100) is provided with: a transfer band control unit (13) for deciding upon a transfer band, on the basis of the result of a comparison of communication quality information pertaining to wireless communication, and a predetermined band control threshold value; a modulation scheme control unit (14) for deciding on a modulation scheme, on the basis of the result of a comparison of communication quality information and a predetermined modulation control threshold value; a transmission process unit (11) for controlling the transfer band for packet signals on the basis of the transfer band decided upon by the transfer band control unit (13), and outputting packet signals; and a wireless transceiver unit (12), for performing a modulation (Continued)

process on the packet signals output by the transmission process unit (11), doing so on the basis of the modulation scheme decided upon by the modulation scheme control unit (14). The band control threshold value and the modulation control threshold value are different values. In so doing, loss of high-priority packet signals, as well as transient fluctuations of transfer delay time, are avoided.

6 Claims, 5 Drawing Sheets

(51) Int. Cl.
      *H04L 5/00*       (2006.01)
      *H04W 24/08*       (2009.01)
      *H04W 28/02*       (2009.01)

(52) U.S. Cl.
      CPC .......... *H04L 5/0044* (2013.01); *H04L 5/0064* (2013.01); *H04W 24/08* (2013.01); *H04W 28/0236* (2013.01)

(56) References Cited

U.S. PATENT DOCUMENTS

| 2007/0121738 A1* | 5/2007 | Yoshii .................. H04B 1/707 375/260 |
| 2009/0239560 A1 | 9/2009 | Nakamura |
| 2011/0249678 A1 | 10/2011 | Bonicatto et al. |
| 2012/0230190 A1 | 9/2012 | Suzuki |

FOREIGN PATENT DOCUMENTS

| JP | 2012-064992 | 3/2012 |
| WO | WO 2011/074681 A1 | 6/2011 |

OTHER PUBLICATIONS

International Search Report and Written Opinion mailed Aug. 6, 2013 in corresponding PCT International Application.

* cited by examiner

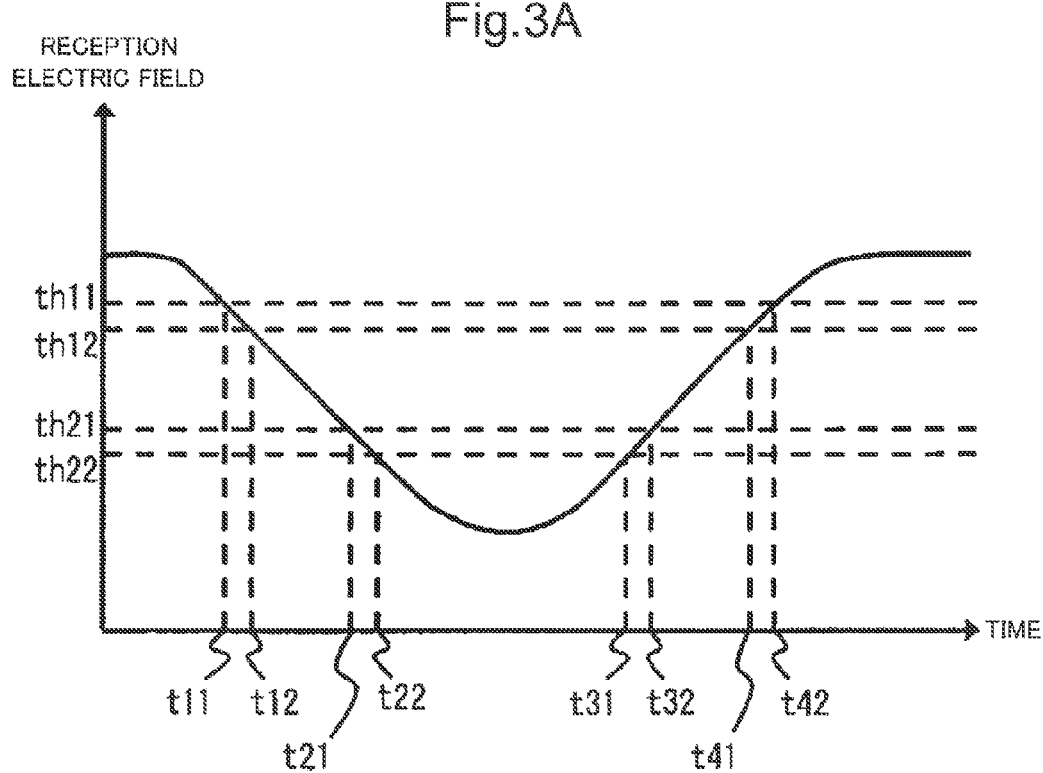
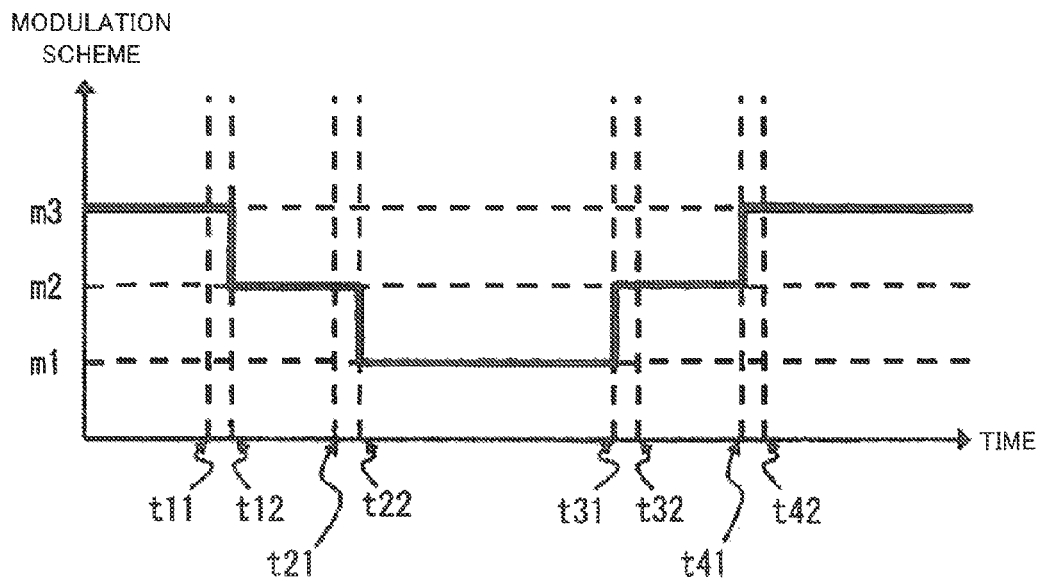

Fig. 4

| CONDITION | RECEPTION ELECTRIC FIELD INFORMATION (X) | MODULATION SCHEME | WIRELESS TRANSFER CAPACITY | PACKET TRANSFER BAND |
|---|---|---|---|---|
| (a) | $X > th11$ | m3 | c3 | pc3 |
| (b) | $th11 \geq X > th12$ | m3 | c3 | pc2 |
| (c) | $th12 \geq X > th21$ | m2 | c2 | pc2 |
| (d) | $th21 \geq X > th22$ | m2 | c2 | pc1 |
| (e) | $th22 \geq X$ | m1 | c1 | pc1 |

WIRELESS TRANSFER DEVICE AND METHOD FOR CONTROL OF WIRELESS TRANSFER BAND

CROSS-REFERENCE TO RELATED PATENT APPLICATIONS

This application is a National Stage Entry of International Application No. PCT/JP2013/004159, filed Jul. 4, 2013, which claims priority from Japanese Patent Application No. 2012-156324, filed Jul. 12, 2012. The entire contents of the above-referenced applications are expressly incorporated herein by reference.

TECHNICAL FIELD

The invention relates to a wireless transfer device and a method for control of wireless transfer band.

BACKGROUND ART

A wireless transfer device is known, in which a packet signal received from a wired transfer path is transmitted to an opposite station which is opposed via a wireless transfer path on a one-to-one basis and the opposite station outputs the packet signal to the wired transfer path again.

In a common technology on wireless transfer, if a multi-value number of a wireless modulation scheme is increased in the same wireless reception electric field level, wireless transfer capacity is increased and error tolerance of the wireless transfer path is deteriorated. On the contrary, if the multi-value number of the modulation scheme is decreased in the same wireless reception electric field level, the wireless transfer capacity is reduced and high error tolerance can be secured. Namely, if the multi-value number of the wireless modulation scheme is decreased in a situation in which the reception electric field level is reduced, though the wireless transfer capacity is reduced, high error tolerance can be obtained and line quality can be kept.

Generally, transmission capacity of the wireless transfer path tends to be small compared with the wired transfer path. However, since traffic is rapidly increased with recent rapid expansion of a mobile phone network and increase of data communication use, it is strongly desired to secure large transfer capacity in the wireless transfer path.

As one of techniques to secure larger transfer capacity of the wireless transfer path, an adaptive modulation function is known. When the multi-value number of the wireless modulation scheme is increased, compared with a normal operation condition, in a state in which the wireless reception electric field level is high and the line quality is high, larger transfer capacity can be acquired by using a wireless transfer device with the adaptive modulation function.

However, since the wireless transfer capacity which is used with modulation scheme changeover changes, the wireless transfer device with the adaptive modulation function needs to carry out suppression control of an amount of traffic to be sent to the wireless transfer path by following the change. If suppression control of the wireless transfer capacity and the amount of traffic is concurrently carried out when the control is carried out, traffic loss in transferring traffic and fluctuation of transfer delay time due to influence of transient buffering control, and the like, may occur.

Accordingly, in the wireless transfer device which transfers highly important traffic in which it is desirable not to generate traffic loss and fluctuation of transfer delay time, the problem is required to be solved.

Various proposals have been made, on a method for securing a reception electric field margin for maintaining a line by using the adaptive modulation function controlling the wireless modulation scheme, and for maintaining a transfer function of important traffic when the line quality of the wireless transfer path.

For example, Patent Literature 1 discloses a method for monitoring the wireless transfer capacity and controlling a signal band to be transmitted to the wireless transfer path depending on change of the wireless transfer capacity, in the system in which the transfer capacity of the wireless transfer path on the basis of the adaptive modulation control. By carrying out the method, unnecessary traffic congestion situation can be avoided and transfer rate and transfer quality of an important traffic can be maintained.

CITATION LIST

Patent Literature

PTL 1: Japanese Patent Application Laid-Open No. 2011-239322

SUMMARY OF INVENTION

Technical Problem

However, in a common method for maintaining transfer rate and transfer quality of an important traffic, after wireless transfer capacity changes, a transfer band of a packet signal transmitted to a wireless transfer path is controlled depending on the change. Therefore, when adaptive modulation control is carried out so that the wireless transfer capacity is reduced, an operation for reducing the transfer band of the packet signal to be transmitted late to the wireless transfer path is carried out with respect to reduction control of the wireless transfer capacity, a situation in which the transfer band of the packet signal excesses the wireless transfer capacity temporarily occurs. In such case, problems exist, in which a high priority packet is lost and fluctuation of transfer delay time occurs.

Solution to Problem

A wireless transfer device of the invention is a wireless transfer device for controlling a wireless modulation scheme and a transfer band of a packet signal, which includes a transfer band control unit which decides upon the transfer band on the basis of a result of a comparison of communication quality information of wireless communication, and a predetermined band control threshold value, a modulation scheme control unit which decides on a modulation scheme on the basis of a result of a comparison of the communication quality information and a predetermined modulation control threshold value, a transmission process unit which controls a transfer band for a packet signal on the basis of the transfer band decided upon by the transfer band control unit, and outputs the packet signal, and a wireless transceiver unit which performs a modulation process on the packet signal output by the transmission process unit, on the basis of the modulation scheme decided upon by the modulation scheme control unit, wherein the band control threshold value and the modulation control threshold value are different values.

A method for control of wireless transfer band of the invention is a method for acquiring communication quality information of wireless communication, and deciding upon a transfer band and a modulation scheme, on the basis of the acquired communication quality information, and includes deciding upon the transfer band and the modulation scheme so that changeover of the transfer band is carried out prior to changeover of the modulation scheme while communication quality is deteriorated.

Advantageous Effects of Invention

Loss of the high priority packet and transient fluctuation of transfer delay time are avoided.

BRIEF DESCRIPTION OF DRAWINGS

FIG. 3A is a diagram illustrating transition of a time and a reception electric field level in the exemplary embodiment 2, FIG. 3B is a diagram illustrating transition of a scheme to be changed depending on the time and the reception electric field in the exemplary embodiment 2.

FIG. 4 is a diagram illustrating an example of relationship of reception electric field information (X), the modulation scheme, the wireless transfer capacity, and the packet transfer band in the exemplary embodiment 2.

DESCRIPTION OF EMBODIMENTS

Exemplary Embodiment 1

Figure 1:
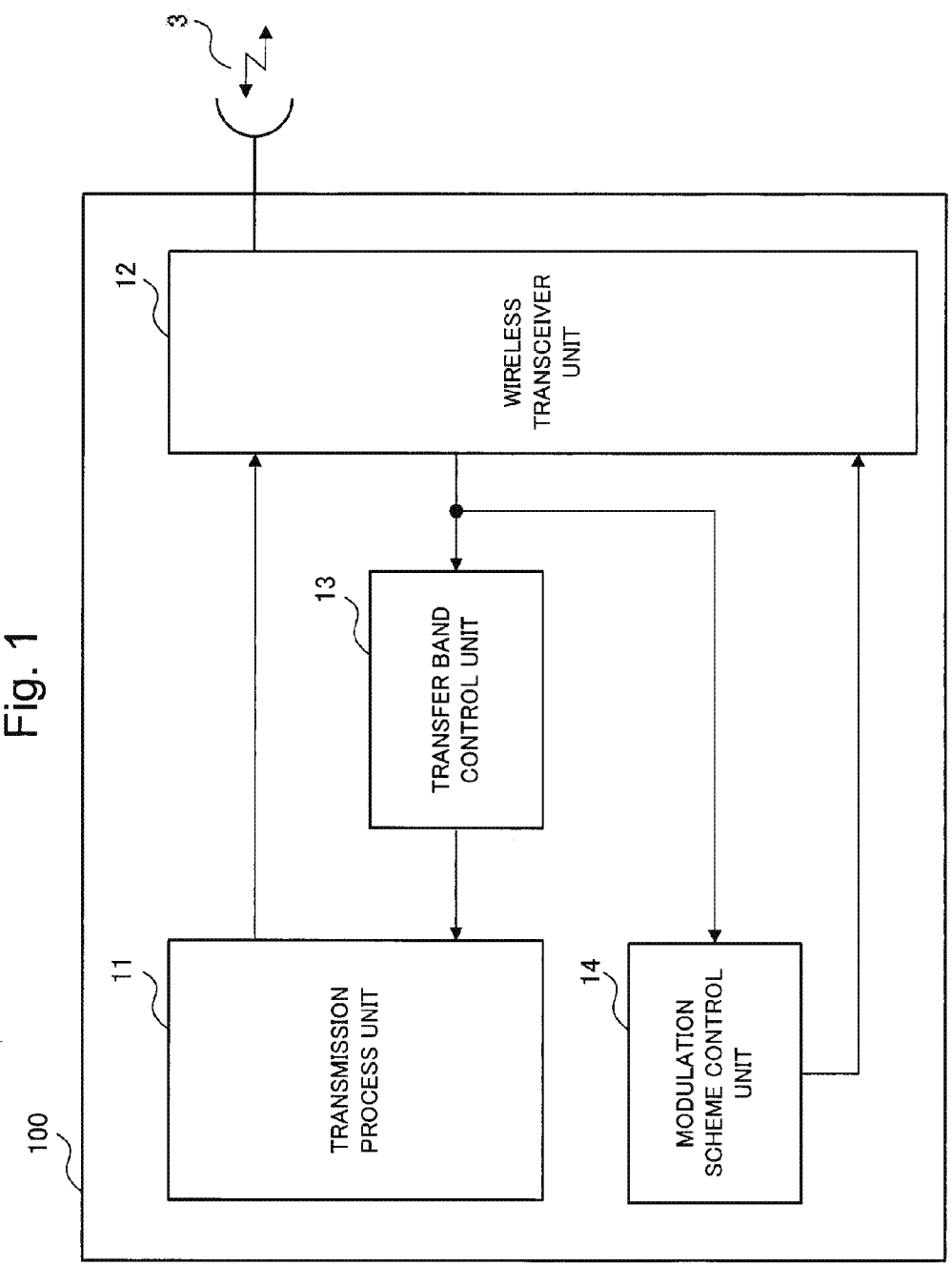
FIG. 1 is a block diagram of a wireless transfer device of an exemplary embodiment 1.

By referring to drawings, an exemplary embodiment of the invention is explained. FIG. 1 is a block diagram illustrating one exemplary embodiment of the invention.

A wireless transfer device 100 includes a transmission process unit 11, a wireless transceiver unit 12, a transfer band control unit 13, and a modulation scheme control unit 14. The wireless transfer device 100 is connected to a wireless transfer path 3.

The transfer process unit 11 reads a packet signal from a high priority buffer 22 and a low priority buffer 23, and outputs to the wireless transceiver unit 12. At this time, the transmission process unit 11 controls a transfer band of the packet signal to be outputted to the wireless transceiver unit 12 on the basis of a transfer band control signal received from the transfer band control unit 13.

The wireless transceiver unit 12 converts the packet signal received from the transmission process unit 11 into a wireless transfer signal and outputs to the wireless transfer path 3. The wireless transceiver unit 12 acquires communication quality information of the wireless transfer path 3. In explanations below, a reception electric field level is used as the communication quality information. The wireless transceiver unit 12 acquires a reception electric field level of a wireless signal used for decision of line quality, generates reception electric field information, and informs the transfer band control unit 13 and the modulation scheme control unit 14. Further, the wireless transceiver unit 12 controls a modulation scheme and wireless transfer capacity of the wireless transfer path 3 on the basis of modulation scheme information received from the modulation scheme control unit 14. The wireless transceiver unit 12 extracts a packet signal from a wireless transfer signal received from another wireless transfer device (not shown) which is in a communication state with a wireless transfer device 200 via the wireless transfer path 3.

The transfer band control unit 13 controls a transfer band of a packet signal which can be secured in the wireless transfer path on the basis of the reception electric field information informed from the wireless transceiver unit 12. Specifically, the transfer band control unit 13 compares the reception electric field level identified by the reception electric field information with a predetermined band control threshold value, generates the transfer band control signal on the basis of a result of the comparison, and outputs to the transmission process unit 11.

The modulation scheme control unit 14 generates the modulation scheme information by selecting a modulation scheme for maintaining the line quality of the wireless transfer path at a predetermined level, on the basis of the reception electric field information informed from the wireless transceiver unit 12, and outputs to the wireless transceiver unit 12. Specifically, the modulation scheme control unit 14 compares the reception electric field level identified by the reception electric field with a predetermined modulation control threshold value, generates the modulation control signal by selecting the modulation scheme on the basis of the result of the comparison, and outputs to the wireless transceiver unit 12.

In the exemplary embodiment of the invention, the band control threshold value used in the transfer band control unit 13 is different from the modulation control threshold value used in the modulation scheme control unit 14. Specifically, when the reception electric field level is deteriorated, that is, when the communication quality is deteriorated, the band control threshold value and the modulation control threshold value are set so that transfer band reduction control is carried out prior to reduction of the wireless transfer capacity by modulation control. By carrying out such control, loss of the packet signal and transient fluctuation of transfer delay time are avoided.

Exemplary Embodiment 2

Figure 2:
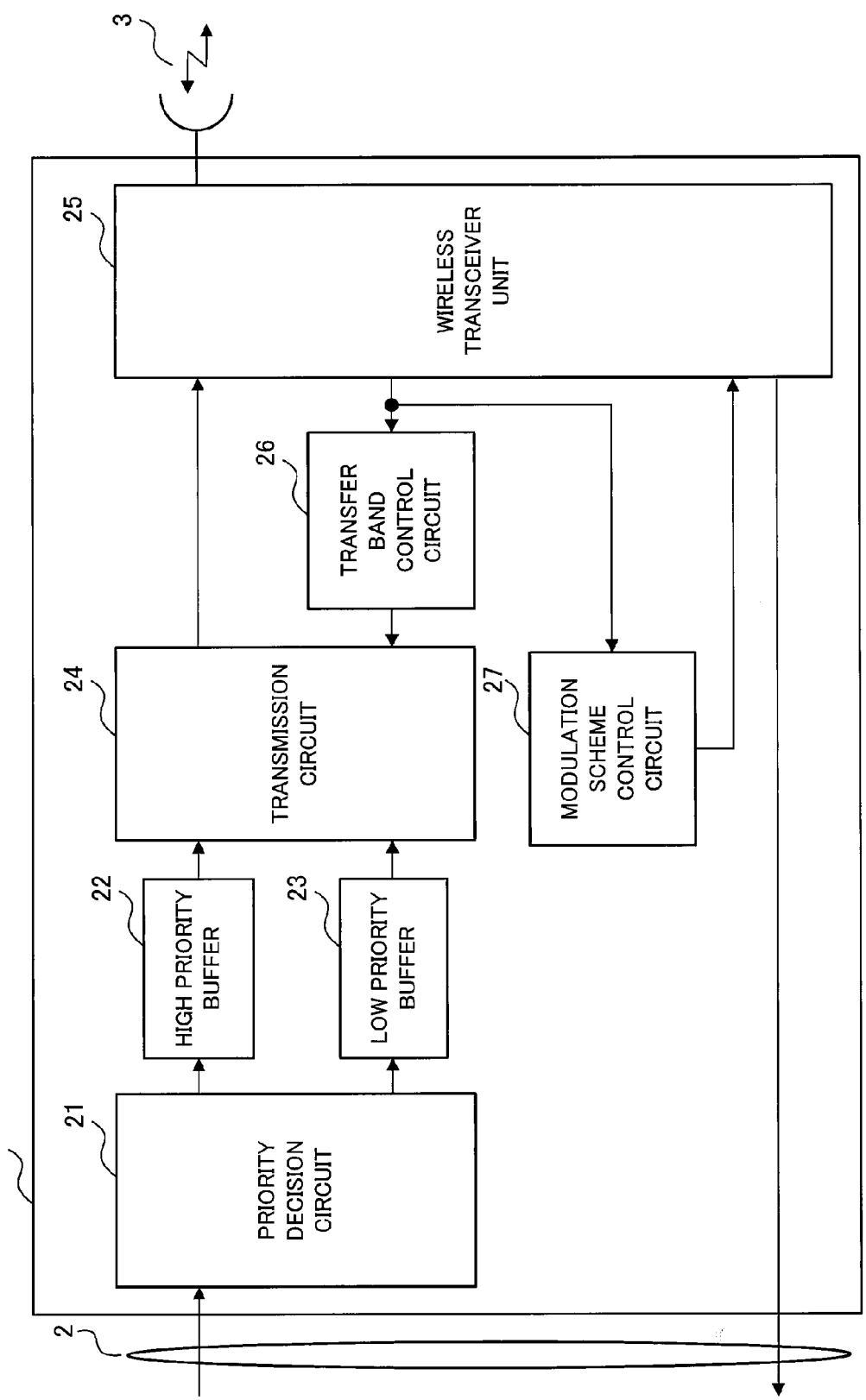
FIG. 2 is a block diagram of a wireless transfer device of the exemplary embodiment 2.

FIG. 2 is a block diagram illustrating one exemplary embodiment of the invention. The wireless transfer device 200 with an adaptive modulation function is connected to a wired transfer path 2 and the wireless transfer path 3. The wireless transfer device 200 includes a priority decision circuit 21, the high priority buffer 22, the low priority buffer 23, a transmission circuit 24, a wireless transceiver circuit 25, a transfer band control circuit 26, and a modulation scheme control circuit 27.

The priority decision circuit 21 decides upon transfer priority of a packet signal received from the wired transfer path 2 on the basis of a predetermined priority decision condition. The priority decision circuit 21 outputs a packet signal with high transfer priority to the high priority buffer 22, and outputs a packet signal with low transfer priority to the low priority buffer 23. As the priority decision condition by the priority decision circuit 21, address information, a priority identifier, and the like, described in the packet signal can be employed.

The high priority buffer 22 and the low priority buffer 23 temporarily store the packet signal received via the priority decision circuit 21.

The transmission circuit 24 controls the transfer band of the packet signal to be outputted to the wireless transceiver circuit 25 on the basis of the transfer band control signal received from the transfer band control circuit 26. The transmission circuit 24 reads the packet signal from the high priority buffer 22 and the low priority buffer 23, and outputs to the wireless transceiver circuit 25.

The wireless transceiver circuit 25 converts the packet signal received from the transmission circuit 24 into a wireless transfer signal and outputs to the wireless transfer path 3. The wireless transceiver circuit 25 acquires communication quality information of the wireless transfer path 3. Specifically, the wireless transceiver circuit 25 acquires a reception electric field level of a wireless signal used for decision of line quality to generate reception electric field information and informs the transfer band control circuit 26 and the modulation scheme control circuit 27. The wireless transceiver circuit 25 extracts the packet signal from the wireless transfer signal received, via the wireless transfer path 3, from a wireless transfer device (not shown) opposite to the wireless transfer device 200 and outputs to the wired transfer path 2. The wireless transceiver circuit 25 controls the modulation scheme and the wireless transfer capacity of the wireless transfer path 3 on the basis of modulation scheme information received from the modulation scheme control circuit 27.

The transfer band control circuit 26 controls a transfer band of a packet signal which can be secured in the wireless transfer path on the basis of the reception electric field information received from the wireless transceiver unit 25. Specifically, the transfer band control circuit 26 generates the transfer band control signal on the basis of a result of the decision on the reception electric field information and outputs to the transmission circuit 24. In other words, the transfer band control circuit 26 generates the transfer band control signal on the basis of the relationship between the reception electric field level identified by the reception electric field information and a predetermined band control threshold value, and outputs the transfer band control signal to the transmission circuit 24.

The modulation scheme control circuit 27 receives the reception electric field information from the wireless transceiver circuit 25 and monitors. The modulation scheme control circuit 27 selects a modulation scheme in which line quality of the wireless transfer path is maintained at a predetermined constant level, generates modulation scheme information, and outputs to the wireless transceiver circuit 25. In other words, the modulation scheme control circuit 27 selects a modulation scheme on the basis of the relationship between the reception electric field level identified by the reception electric field information and a predetermined modulation control threshold value, generates modulation scheme information, and outputs to the wireless transceiver circuit 25.

Next, operations in which the wireless transceiver circuit 25, the transfer band control circuit 26, and the modulation scheme control circuit 27 control a modulation scheme, wireless transfer capacity, and a transfer band of a packet signal, depending on a reception electric field level of a wireless signal in the wireless transfer path 3 are described in detail using FIG. 3 and FIG. 4.

Figure 3C:
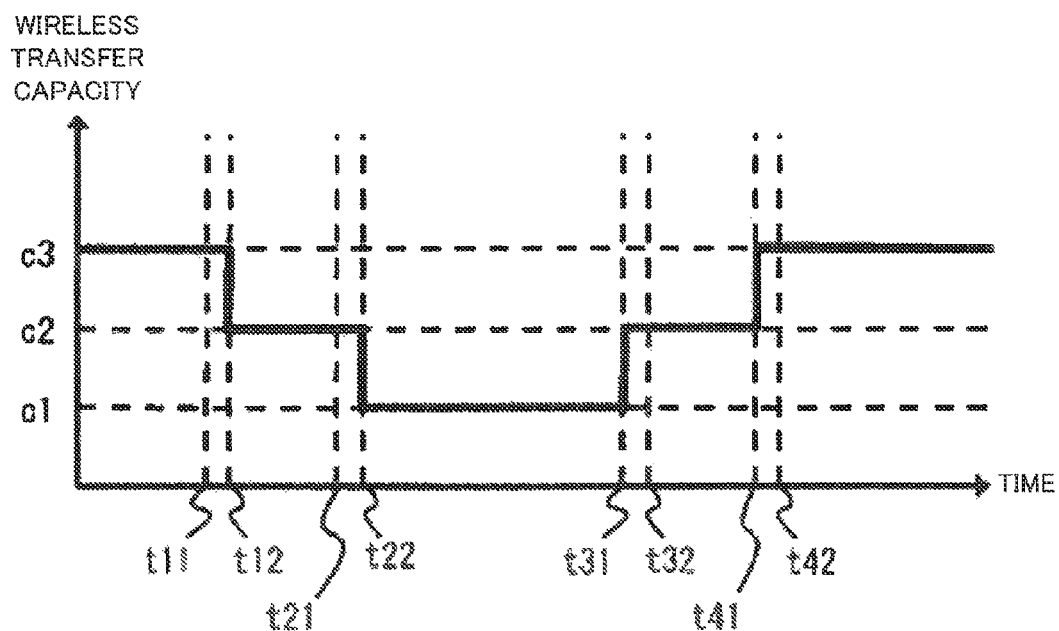
FIG. 3C is a diagram illustrating transition of wireless transfer capacity to be changed depending on the time and the reception electric field in the exemplary embodiment 2.
Figure 3D:
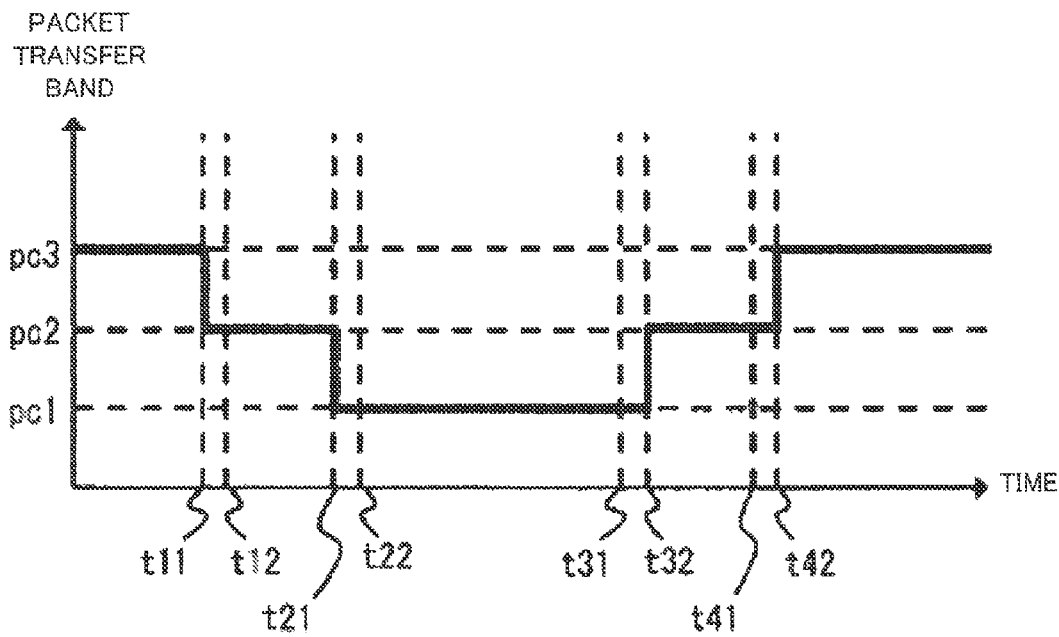
FIG. 3D is a diagram illustrating transition of a transfer band of a packet signal to be changed depending on the time and the reception electric field in the exemplary embodiment 2.

FIG. 3 shows examples of graphs illustrating relations between the reception electric field level of wireless signal in wireless transfer path 3 and the modulation scheme, wireless transfer capacity, and the transfer band of the packet signal. Times t11, t12, t21, t22, t31, t32, t41, t42 in FIG. 3A to FIG. 3D are times common to the same sighs one another.

Reception electric field levels th11, th21 are the band control threshold values. Reception electric field levels th12, th22 are the modulation control threshold values.

FIG. 3A is a diagram illustrating transition of a time and the reception electric field level, and one example in which the reception electric field level changes with elapse of time. It is shown, in the reception electric field levels th11 and th22, th11 is a higher reception electric field level and in a state in which higher line quality can be maintained.

FIG. 3B shows transition of a time and the modulation scheme, and it is shown, in modulation schemes m3 and m1, m3 selects a modulation scheme with more multi-values.

FIG. 3C shows transition of a time and the wireless transfer capacity, the wireless transfer capacity conjugates and changes depending on change of the modulation scheme of FIG. 3B. It is shown, in transfer capacity c3 and c1, c3 is larger wireless transfer capacity.

FIG. 3D shows transition of a time and the transfer band of the packet signal, and it is shown, in packet transfer bands pc3 and pc1, pc3 secures a band which can transfers more packet signals.

FIG. 4 shows one example, which is shown in FIG. 3, on the relationship between the reception electric field information (X) outputted by the wireless transceiver circuit 25 and the modulation scheme, the wireless transfer capacity and the packet transfer band at the time, as a table. A condition (a) of FIG. 4 shows, for example, if the reception electric field information (X) is larger than the reception electric field level th11, m3, c3, and pc3 are selected as the modulation scheme, the wireless transfer capacity, and the packet transfer band, respectively.

Further as one example of an operation of the invention, an operation which is carried out when the reception electric field level of the wireless transfer path 3 is decreased from a state in which the reception electric field level of the wireless transfer path 3 is higher than th11 of FIG. 3A to a middle-level between th12 and th21 through th12 is explained in detail using FIG. 2 to FIG. 4.

The wireless transceiver circuit 25 monitors the reception electric field level of the wireless transfer path 3 which changes as time passes and generates the reception electric field information (X), and successively informs the transfer band control circuit 26, and the modulation scheme control circuit 27.

The transfer band control circuit 26 monitors the reception electric field information (X) received from the wireless transceiver circuit 25. When detecting the electric field level becomes th11 at the time t11 of FIG. 3, the transfer band control circuit 26 decides that a situation which corresponds to the condition (a) of FIG. 4 shifts to the condition (b) of FIG. 4, generates the transfer band control signal to decrease the packet transfer band from pc3 to pc2, and informs the transmission circuit 24.

The transmission circuit 24 receives the transfer band control signal, adjusts an amount of the packet signals to be read from the high priority buffer 22 and the low priority buffer 23 so that the transfer band of the packet signal outputted to the wireless transceiver circuit 25 becomes pc2 of FIG. 3D or less, and outputs the packet signal to the wireless transceiver circuit 25. At this time, when it is detected that the packet transfer band indicated by the transfer band control signal changes from pc3 to pc2, the packet signal which is currently outputted to the wireless transceiver circuit 25 is transmitted without delay, and suppressing control on the transfer band is carried out.

On the contrary, while the modulation scheme control circuit 27 monitors the reception electric field information (X) received from the wireless transceiver circuit 25, and decides that the situation which corresponds to the condition (a) of FIG. 4 shifts to the condition (b) of FIG. 4, when detecting that the reception electric field becomes th11 at the time t11 of FIG. 3, the modulation scheme to be selected is not changed in the condition (a) and the condition (b) of FIG. 4, as shown in the graph of FIG. 3B, the modulation scheme m3 is maintained.

Further, when time passes to be at time t12, the transfer band control circuit 26 and the modulation scheme control circuit 27 detect that the reception electric field level becomes th12 at the time t12 of FIG. 3, from the reception electric field information (X) received from the wireless transceiver circuit 25, and decide that the situation which corresponds to the condition (b) of FIG. 4 shifts to the condition (c) of FIG. 4.

At this time, though the transfer band control signal generated by the transfer band control circuit 26 does not change in the situation of the packet transfer band pc2, since the modulation scheme to be selected on the condition (b) is different from the modulation scheme to be selected on the condition (c), the modulation scheme control circuit 27 generates a modulation scheme control signal to convert the modulation scheme from m3 to m2 and informs the wireless transceiver circuit 25.

The wireless transceiver circuit 25 changes the modulation scheme of the wireless transfer path from m3 to m2 on the basis of the modulation scheme control signal, and the wireless transfer capacity is reduced from c3 to c2 as shown in FIG. 3C therewith. Since the packet transfer band is already reduced to pc2 at the time t12, the packet signal received from the transmission circuit 24 is not influenced by reduction of the wireless transfer capacity from c3 to c2.

As described above, by carrying out reduction control of the packet transfer band prior to reduction of the wireless transfer capacity by changeover of the modulation scheme in the situation in which the reception electric field level of the wireless transfer path 3 is decreased, by making a difference between the modulation control threshold value as the standard for changeover of the modulation scheme and the band control threshold value as the standard for changeover of the transfer band of the packet signal, modulation scheme changeover by the adaptive modulation without affecting a transferring packet signal and the reduction control of the wireless transfer capacity therewith can be carried out.

Thereby when the reception electric field level of the wireless transfer path is lowered and the modulation scheme of the wireless transfer path, the wireless transfer capacity and the transfer band of the packet signal are controlled so that the wireless transfer capacity is reduced, the reduction control of the transfer band of the packet signal to be transmitted to the wireless transfer path can be carried out prior to the reduction control of the wireless transfer capacity. When the reception electric field level of the wireless transfer path is improved, and the modulation scheme of the wireless transfer path, the wireless transfer capacity and the transfer band of the packet signal are controlled so that the wireless transfer capacity is enlarged, enlargement control of the wireless transfer capacity can be carried out prior to expansion control of the transfer band of the packet signal. Therefore, loss of the packet signal with high priority and transient fluctuation of the transfer delay time can be avoided by change of the wireless transfer capacity with modulation scheme changeover.

The invention is not limited to the above described exemplary embodiments, and various changes can be made within the scope of the invention.

For example, the wireless transfer device related to the exemplary embodiments of the invention may not necessarily be a device connected to other devices using a cable, and sound inputting means and data inputting means may be included in the wireless transfer device.

In the exemplary embodiment of the invention shown in FIG. 2, the packet signal received from the wired transmission path is divided to two priority levels via the priority decision circuit 21 to be stored in the high priority buffer 22 and the low priority buffer 23. However division of the priority levels may not be two.

In the exemplary embodiment of the invention shown in FIG. 2, the electric field level of the wireless signal is used for decision of the line quality of the wireless transfer path. The decision scheme of the line quality is not limited to the method, for example, a bit error rate of a wireless line or a SN ratio (Signal Noise Ratio) may be used.

This application is based upon and claims the benefit of priority from Japanese Patent Application No. 2012-156324, filed on Jul. 12, 2012, the disclosure of which is incorporated herein in its entirety by reference.

INDUSTRIAL APPLICABILITY

This invention can be used as a communication device for infrastructure used by a communication operator, and the like, in particular a fixed wireless transfer device using a microwave or millimeter wave.

REFERENCE SIGNS LIST 2 wired transfer path
3 wireless transfer path
11 transmission process unit
12 wireless transceiver unit
13 transfer band control unit
14 modulation scheme control unit
21 priority decision circuit
22 high priority buffer
23 low priority buffer
24 transmission circuit
25 wireless transceiver circuit
26 transfer band control circuit
27 modulation scheme control circuit
100 wireless transfer device
200 wireless transfer device

The invention claimed is:

1. A wireless transfer device, comprising:
a memory storing instructions;
one or more processors configured to execute the instructions to:
  determine a transfer band for a packet signal transmitted to a wireless transfer path, on the basis of a result of a comparison of communication quality information pertaining to wireless communication, and a predetermined band control threshold value which is a standard for changing the transfer band;
  determine a modulation scheme to be applied to the wireless transfer path, on the basis of a result of a comparison of the communication quality information and a predetermined modulation control threshold value which is a standard for changing the modulation scheme;
  secure the determined transfer band in the wireless transfer path, and output the packet signal; and
  perform a modulation process on the packet signal, on the basis of the determined modulation scheme, wherein the band control threshold value and the modulation control threshold value are set to be different values, to create a time lag between an operation for changing the transfer band and an operation for changing wireless transfer capacity of the wireless transfer path, the wireless transfer capacity being changed in conjunction with the changing of the modulation scheme.

2. The wireless transfer device of claim 1, wherein the band control threshold value is set to be larger than the modulation control threshold value so that: the operation for changing the transfer band is carried out prior to the operation for changing the modulation scheme when communication quality of the wireless transfer path is deteriorated, and the operation for changing the modulation scheme is carried out prior to the operation for changing the transfer band when the communication quality of the wireless transfer path is improved.

3. The wireless transfer device of claim 1, wherein the communication quality information on the wireless communication includes at least one of an electric field level of the wireless communication, a bit error rate of a wireless line, or an SN ratio (signal noise ratio).

4. A method for controlling a transfer band for a packet signal transmitted to a wireless transfer path and a modulation scheme to be applied to the wireless transfer path, the method comprising:
  determining the transfer band, on the basis of a result of a comparison of communication quality information pertaining to wireless communication, and a predetermined band control threshold value which is a standard for changing the transfer band;
  determining the modulation scheme, on the basis of a result of a comparison of the communication quality information and a predetermined modulation control threshold value which is a standard for changing the modulation scheme;
  securing the determined transfer band in the wireless transfer path, and outputting the packet signal; and
  performing a modulation process on the packet signal, on the basis of the determined modulation scheme,
  wherein the band control threshold value and the modulation control threshold value are set to be different values, to create a time lag between an operation for changing the transfer band and an operation for changing wireless transfer capacity of the wireless transfer path, the wireless transfer capacity being changed in conjunction with the changing of the modulation scheme.

5. The method of claim 4, wherein the band control threshold value is set to be larger than the modulation control threshold value so that: the operation for changing the transfer band is carried out prior to the operation for changing the modulation scheme when communication quality of the wireless transfer path is deteriorated, and the operation for changing the modulation scheme is carried out prior to the operation for changing the transfer band when the communication quality of the wireless transfer path is improved.

6. The method of claim 4, wherein the communication quality information on the wireless communication includes at least one of an electric field level of the wireless communication, a bit error rate of a wireless line, or an SN ratio (signal noise ratio).

* * * * *